May 14, 1929. L. SCHÖN 1,712,719
CONVERTING MULTIPHASE CURRENT INTO SINGLE PHASE CURRENT AND VICE VERSA
Filed May 21, 1925

Patented May 14, 1929.

1,712,719

UNITED STATES PATENT OFFICE.

LUDWIG SCHÖN, OF ESSEN, GERMANY, ASSIGNOR TO FRIED KRUPP AKTIENGESELL-SCHAFT, OF ESSEN-ON-THE-RUHR, GERMANY.

CONVERTING MULTIPHASE CURRENT INTO SINGLE-PHASE CURRENT AND VICE VERSA.

Application filed May 21, 1925, Serial No. 31,897, and in Germany July 4, 1924.

The invention relates to devices which serve to convert multiphase current into single phased current and vice-versa and in which only stationary windings are made use of for the transmission of energy. The invention has for its object to so improve converters of the character stated that the load is distributed in a completely uniform manner to the single phases of the multiphase winding and simultaneously the phase displacement of the primary current is compensated and the load may be considerably increased with this end in view, the invention consists in certain novel features of construction and combination of parts the essential elements of which are set forth in appended claims, and a preferred form of embodiment of which is hereinafter described with reference to the drawings which accompany and form part of the specification.

Figure 1:
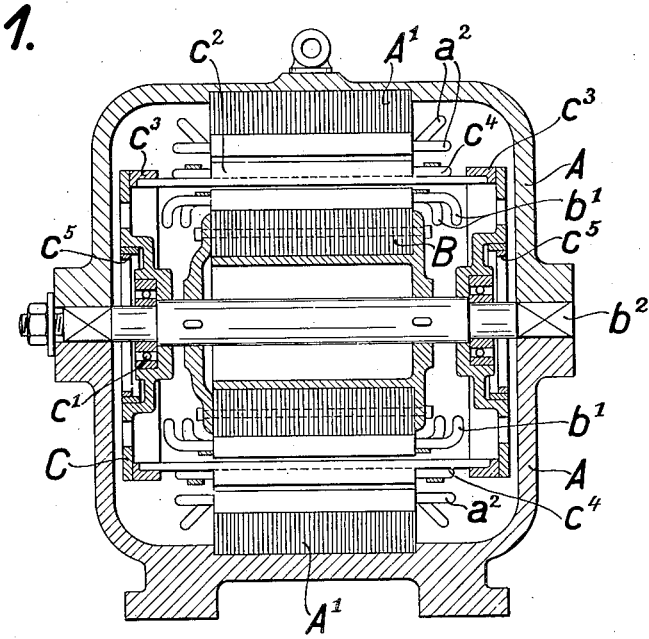
Fig. 1 is a longitudinal section through the converter.

The converter, Fig. 1, is built in the manner of an induction motor and has a two-part casing A which encloses a stator $A^1$ carrying a three-phase winding $a^2$. The stator $A^1$ has cooperating with it a body B which is constructed like the rotor of an induction motor and fitted with a single-phase winding $b^1$. This body B which is hereinafter denoted the "stationary rotor", is rigidly mounted on an axis $b^2$ fast in the casing A. The three-phase winding $a^2$ of the stator $A^1$ and the single-phase winding $b^1$ of the stationary rotor B constitute the power windings of the converter.

The air-gap existing between stator $A^1$ and stationary rotor B is enlarged beyond the extent usual in induction motors and substantially filled out by the shell-portion of an auxiliary rotor C whch is mounted for easy rotation on the axle $b^2$ by means of ball-bearings $c^1$. This shell-portion is composed of a plurality of bars $c^2$ separated from each other by air-gaps and extending in parallel with the axis of rotation of the auxiliary rotor, said bars being made of iron and copper, alternately. At each side of the auxiliary rotor the bars $c^2$ are conductively connected by means of a brass-ring $c^3$ so that all these bars are connected in parallel and constitute together with the brass-rings $c^3$ a short-circuit winding which is rotatable about the common axis of the stator $A^1$ and the stationary rotor B. The auxiliary rotor C is not destined to deliver mechanical power, but is evidently able, like an ordinary short-circuit rotor, to be started and kept in motion by the rotating field generated in the stator.

There is arranged on the auxiliary rotor C an exciting winding $c^4$ which may be connected through slip rings $c^5$ to a source of continuous current (not shown). The slip rings are arranged on the end faces of the auxiliary rotor C in the manner shown in Fig. 1.

Figure 2:
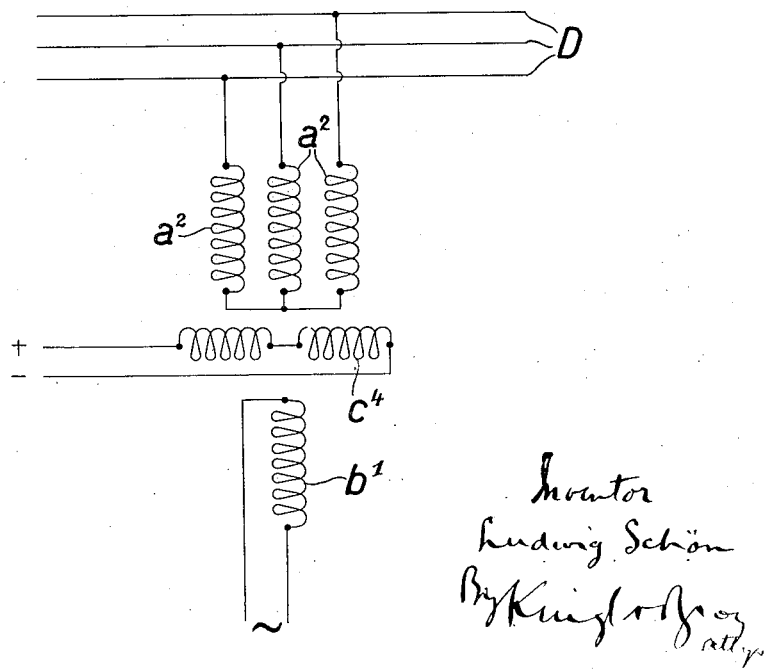
Fig. 2 is the corresponding wiring diagram.

Referring to the diagram illustrated in Fig. 2, D denotes a three-phase main to which the three-phase stator winding $a^2$, constituting the primary winding of the described converter, is connected, $b^1$ denotes, the appropriate single-phase secondary winding of the converter and $c^4$ the said exciting winding of the auxiliary rotor C which winding may be connected to a source of continuous current.

If the stator wound for three-phase current, of a three-phase motor is connected to a three-phase main, while the rotor wound for single-phase current is kept at rest, single-phase alternating current may be taken, as it is well-known, from the rotor winding, this current having the frequency of the three-phase main. A uniform load of all the three phases is, however, impossible in this case, because the alternating field generated by the single-phase rotor current will result, together with the constant rotating field of the stator, in an elliptical, that is in a non-uniform rotating field.

Now, the line of action of a motor of the character stated the rotor of which is kept at rest, will thoroughly change if an auxiliary rotor C, rotatable about the axis of the stationary rotor and forming a short-circuit winding, is arranged between the stator $A^1$ and said stationary rotor B, as in the converter hereinbefore described which is, as to the rest, of the same construction as the motor above-mentioned. For, this auxiliary rotor C will immediately start rotating under the action of the constant rotating field of the stator, when the three-phase primary winding $a^2$ is put in circuit, and will quickly reach a number of revolutions dependent on the frequency prevailing in the main and thus on that of the alternating field of the rotor, these frequencies being equal.

When this phenomenon takes place, a resulting circular rotating field will be formed, as testings have shown, so that a uniform distribution of the energy taken off from the stator winding $a^2$, from the three phases of the three-phase main is secured with any desired load of the single phase winding $b^1$.

When, further, the winding $c^4$ arranged on the auxiliary rotor C is excited by connecting it to a source of continuous current, then, according to the strength of this exciting current, the phase-displacement of the converter is able to be reduced, to disappear or to be converted into lead.

As is the case in every converter, the primary and secondary winding may be exchanged without difficulty that is the described device may also serve to convert single-phase alternating current into three-phased current.

Without deviating from the spirit of the invention, the construction of the auxiliary rotor C can be altered in several respects. For instance, the iron bars $c^2$ may be replaced by bars made of non-magnetic material such as copper, or, inversely, iron bars may be used instead of the copper bars. While in the first case the electric properties of the auxiliary rotor C would be improved at the expense of the quality of the magnetic interlinking of stator $A^1$ and stationary rotor B, in the second case the ferro-magnetic shell-portion of rotor C would have a double object, viz, to convey the lines of force of the stator field to the stationary rotor B and to conduct the short-circuit currents. Finally, the shell-portion composed of insulated iron bars might be replaced by a full drum-shell made of ferro-magnetic material, whereby the construction of the auxiliary rotor would be simplified.

Claims:

1. In a device for converting multiphase current into single-phase current and vice-versa a stator carrying one of the converter windings, a rotor-like stationary body carrying the other converter winding, a squirrel-cage rotor rotatable between said stator and said rotor-like stationary body about the common axis of them, the shell portion of said rotor at least partly consisting of ferro-magnetic material, an exciting winding arranged on said rotor and means for connecting the exciting winding to a source of current.

2. In a device for converting multiphase current into single-phase current and vice-versa a stator carrying one of the converter windings, a rotor-like stationary body carrying the other converter winding, a rotor rotatable between said stator and said rotor-like stationary body about the common axis of them, metallic end rings on said rotor, iron and copper bars alternately arranged on said rotor and extending in parallel with its axis of rotation and connected to said metallic end rings, an exciting winding arranged on said rotor and means for connecting the exciting winding to a source of current.

3. In a device for converting multiphase current into single-phase current and vice-versa a stator carrying one of the converter windings, a rotor-like stationary body carrying the other converter winding, a rotor rotatable between said stator and said rotor-like stationary body about the common axis of them, a short-circuit winding and an exciting winding arranged on said rotor and means for connecting the exciting winding to a source of current.

4. In a device for converting multiphase current into single-phase current and vice-versa a stator carrying the multiphase winding, a rotor-like stationary body carrying the single-phase winding, a rotor rotatable between said stator and said rotor-like stationary body about the common axis of them, a short-circuit winding and an exciting winding arranged on said rotor and means for connecting the exciting winding to a source of current.

The foregoing specification signed at Cologne, Germany, this 24th day of April, 1925.

LUDWIG SCHÖN.